(12) United States Patent
Ogawa (10) Patent No.: US 11,165,114 B2
(45) Date of Patent: Nov. 2, 2021

(54) ENERGY STORAGE DEVICE

(71) Applicant: GS Yuasa International Ltd., Kyoto (JP)

(72) Inventor: Masumi Ogawa, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 173 days.

(21) Appl. No.: 16/478,450

(22) PCT Filed: Jan. 17, 2018

(86) PCT No.: PCT/EP2018/051129
§ 371 (c)(1),
(2) Date: Jul. 16, 2019

(87) PCT Pub. No.: WO2018/134267
PCT Pub. Date: Jul. 26, 2018

(65) Prior Publication Data
US 2020/0006719 A1 Jan. 2, 2020

(30) Foreign Application Priority Data

Jan. 20, 2017 (JP) .............................. JP2017-008744

(51) Int. Cl.
*H01M 50/169* (2021.01)
*H01M 50/15* (2021.01)
(Continued)

(52) U.S. Cl.
CPC ..... *H01M 50/169* (2021.01); *H01M 10/0431* (2013.01); *H01M 10/0525* (2013.01);
(Continued)

(58) Field of Classification Search
CPC .......... H01M 2/04; H01M 2/26; H01M 10/04; H01M 2/02; H01M 50/169; H01M 50/103; H01M 50/51; H01M 50/139
See application file for complete search history.

(56) References Cited

U.S. PATENT DOCUMENTS

2005/0153194 A1   7/2005  Kimura et al.
2012/0064394 A1*  3/2012  Kim .................... H01M 2/0217
                                                        429/181

(Continued)

FOREIGN PATENT DOCUMENTS

EP      3 168 896 A2    5/2017
JP      2011-216239 A  10/2011
(Continued)

OTHER PUBLICATIONS

International Search Report (ISR) (PCT Form PCT/ISA/210), in PCT/EP2018/051129, dated Apr. 4, 2018.

*Primary Examiner* — Kenneth J Douyette
(74) *Attorney, Agent, or Firm* — McGinn I.P. Law Group, P.L.L.C.

(57) ABSTRACT

An energy storage device includes: an electrode assembly having tab portions; a container body accommodating the electrode assembly; a lid structural body having a lid plate which closes the container body; and an insulating member arranged around a periphery of the electrode assembly in the container body, wherein the insulating member has a locking portion locked to a portion of the lid structural body.

20 Claims, 7 Drawing Sheets

(51) Int. Cl.
*H01M 50/103* (2021.01)
*H01M 10/04* (2006.01)
*H01M 10/0525* (2010.01)
*H01M 10/0587* (2010.01)
*H01M 50/166* (2021.01)
*H01M 50/531* (2021.01)

(52) U.S. Cl.
CPC ..... *H01M 10/0587* (2013.01); *H01M 50/103* (2021.01); *H01M 50/15* (2021.01); *H01M 50/166* (2021.01); *H01M 50/531* (2021.01)

(56) References Cited

U.S. PATENT DOCUMENTS

| | | |
|---|---|---|
| 2013/0029188 A1 | 1/2013 | Kim et al. |
| 2015/0207125 A1 | 7/2015 | Kishimoto |
| 2016/0099444 A1 | 4/2016 | Park et al. |
| 2017/0133655 A1 | 5/2017 | Guen et al. |
| 2019/0044102 A1 | 2/2019 | Ogawa et al. |

FOREIGN PATENT DOCUMENTS

| | | |
|---|---|---|
| JP | 2015-135768 A | 7/2015 |
| JP | 2015-135772 A | 7/2015 |
| JP | 2015-156366 A | 8/2015 |
| JP | 2015-213042 A | 11/2015 |
| WO | WO 2017/045775 A1 | 3/2017 |

\* cited by examiner

ENERGY STORAGE DEVICE

TECHNICAL FIELD

The present invention relates to an energy storage device.

BACKGROUND ART

Conventionally, there has been known an energy storage device which is assembled such that an electrode assembly on which spacers are mounted is inserted into a container (see Patent Document 1, for example).

PRIOR ART DOCUMENT

Patent Document

Patent Document 1: JP-A-2011-216239

SUMMARY OF THE INVENTION

Problems to be Solved by the Invention

After the electrode assembly is inserted into the container, a body of the container and a lid plate are welded to each other. In such an operation, there is a possibility that the lid plate is positionally displaced from the body at the time of welding so that stable welding is impaired.

The present invention has been made to overcome the above-mentioned drawbacks, and it is an object of the present invention to provide an energy storage device where a container body and a lid plate can be welded in a stable manner by preventing the occurrence of positional displacement of the lid plate with respect to the container body.

Means for Solving the Problems

To achieve the above-mentioned object, an energy storage device according to an aspect of the present invention includes: an electrode assembly having a tab portion; a container body accommodating the electrode assembly therein; a lid structural body having a lid plate which closes the container body; and an insulating member arranged around a periphery of the electrode assembly in the container body, wherein the insulating member has a locking portion locked to a portion of the lid structural body.

With such a configuration, the locking portion of the insulating member is locked to the portion of the lid structural body and hence, the positional displacement of the lid structural body with respect to the container body can be prevented. Accordingly, stable welding between the container body and the lid plate can be realized.

The locking portion may be locked by being hooked to the portion of the lid structural body, being hooked on a side opposite from the container body.

With such a configuration, the locking portion of the insulating member is locked by being hooked to the portion of the lid structural body on the side opposite from the container body and hence, the movement of the lid structural body in a move-away direction, that is, the lifting of the lid structural body can be prevented.

The locking portion may have: a contact surface, which is brought into contact with the portion of the lid structural body; and an inclined surface, which is disposed away from the container body than the contact surface and makes an acute angle with the contact surface.

With such a configuration, the inclined surface is disposed away from the container body than the contact surface and hence, at the time of bringing the lid structural body closer to the container body, the lid structural body is guided along the inclined surface. Thereafter, the lid structural body can be brought into contact with the contact surface. Accordingly, the locking portion can be smoothly locked to the portion of the lid structural body.

The insulating member may be a side spacer disposed between the container body and the electrode assembly.

With such a configuration, the side spacer is interposed between the container body and the electrode assembly and hence, the side spacer becomes a member, which is positionally minimally displaced in the inside of the container body. Since the locking portion is formed on the side spacer, even when the lid structural body is going to be positionally displaced, the side spacer minimally follows the lid structural body. Accordingly, the positional displacement of the lid structural body can be surely prevented.

The tab portion of the electrode assembly may oppositely face the lid structural body.

With such a configuration, even when a biasing force attributed to the tab portion is applied to the lid structural body, lifting of the lid structural body can be prevented.

The electrode assembly may be formed by winding electrode plates, and one end portion of the electrode assembly in a winding axis direction may oppositely face the lid structural body.

With such a configuration, also in a so-called lateral winding type electrode assembly where one end portion of the electrode assembly in a winding axis direction oppositely faces the lid structural body, lifting of the lid structural body can be prevented.

The lid structural body may include a gasket, which ensures gas-tightness in the container body by the lid plate, and the locking portion may be locked by being hooked to the gasket.

With such a configuration, even in the case of the lid structural body having the gasket, lifting of the lid structural body can be prevented by locking the locking portion to the gasket.

Advantages of the Invention

According to the present invention, the positional displacement of the lid plate with respect to the container body can be prevented and hence, it is possible to enable stable welding between the container body and the lid plate.

MODE FOR CARRYING OUT THE INVENTION

Hereinafter, an energy storage device according to an embodiment of the present invention is described with reference to drawings. The respective drawings are schematic views, and are not always described strictly accurately.

The embodiment described hereinafter is one specific example of the present invention. In the embodiment described hereinafter, shapes, materials, constitutional elements, the arrangement positions and connection states of the constitutional elements, the order of manufacturing steps and the like are merely examples, and these are not intended to be used for limiting the present invention. Further, out of the constitutional elements in the embodiment described hereinafter, the constitutional elements, which are not described in independent claims describing an uppermost concept, are described as arbitrary constitutional elements.

First, an overall configuration of an energy storage device 10 according to the embodiment is described with reference to FIG. 1 to FIG. 3.

Figure 1:
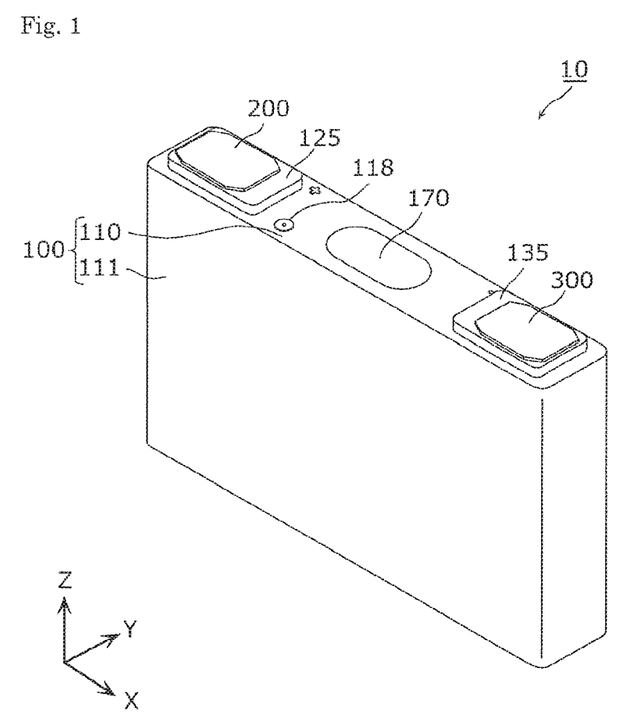
FIG. 1 is a perspective view showing an external appearance of an energy storage device according to an embodiment.

FIG. 1 is a perspective view showing an external appearance of the energy storage device 10 according to the embodiment. FIG. 2 is an exploded perspective view of the energy storage device 10 according to the embodiment. FIG. 3 is an exploded perspective view of a lid structural body 180 according to the embodiment.

In FIG. 1 and the succeeding drawings, for the sake of convenience, the description is made while assuming a Z-axis direction as a vertical direction. However, in an actual use state, there may be also a case where the Z-axis direction and the vertical direction do not agree with each other.

The energy storage device 10 is a secondary battery, which can charge electricity or discharge electricity. To be more specific, the energy storage device 10 is a nonaqueous electrolyte secondary battery such as a lithium ion secondary battery. The energy storage device 10 is applicable to an electric vehicle (EV), a hybrid electric vehicle (HEV), a plug-in hybrid electric vehicle (PHEV), for example. The energy storage device 10 is not limited to a nonaqueous electrolyte secondary battery, and may be a secondary battery other than the nonaqueous electrolyte secondary battery, and may be a capacitor. Further, the energy storage device 10 may be a primary battery.

As shown in FIG. 1, the energy storage device 10 includes: a container 100; a positive electrode terminal 200; and a negative electrode terminal 800. As shown in FIG. 2, an electrode assembly 400 is accommodated in the inside of the container 100, and a lid structural body 180 is disposed above the electrode assembly 400.

The lid structural body 180 includes a lid plate 110 of the container 100, a current collector, and an insulating member. To be more specific, the lid structural body 180 includes a positive electrode current collector 140, which is electrically connected to a tab portion 410 on a positive electrode of the electrode assembly 400. Similarly, the lid structural body 180 includes a negative electrode current collector 150, which is electrically connected to a tab portion 420 on a negative electrode of the electrode assembly 400.

The lid structural body 180 includes, as the above-mentioned insulating member, a lower insulating member 120, which is disposed between the lid plate 110 and the positive electrode current collector 140. Similarly, the lid structural body 180 includes, as the above-mentioned insulating member, a lower insulating member 130, which is disposed between the lid plate 110 and the negative electrode current collector 150.

The lid structural body 180 according to this embodiment further includes the positive electrode terminal 200, the negative electrode terminal 300, an upper insulating member 125, and an upper insulating member 135.

The upper insulating member 125 is disposed between the lid plate 110 and the positive electrode terminal 200. The upper insulating member 135 is disposed between the lid plate 110 and the negative electrode terminal 300.

An upper spacer 500 and a buffer sheet 600 are disposed between the lid structural body 180 and the electrode assembly 400.

The upper spacer 500 is disposed between a side of the electrode assembly 400 where the tab portions 410, 420 are disposed and the lid plate 110. To be more specific, the upper spacer 500 has a flat plate shape as a whole, and has two insertion portions 520 into which the tab portions 410, 420 are respectively inserted. In this embodiment, the insertion portions 520 are formed into a notched shape in the upper spacer 500. The upper spacer 500 is made of a material having an insulating property such as polycarbonate (PC), polypropylene (PP), polyethylene (PE), or a polyphenylene sulfide resin (PPS).

For example, the upper spacer 500 functions as a member for directly or indirectly restricting the upward movement of the electrode assembly 400 (in a direction toward the lid plate 110) or a member for preventing the occurrence of short-circuiting between the lid structural body 180 and the electrode assembly 400.

The buffer sheet 600 is made of a porous material having high flexibility such as foamed polyethylene, and is a member, which functions as a buffer member between the electrode assembly 400 and the upper spacer 500.

In this embodiment, side spacers 700 are disposed between an inner peripheral surface of the container 100 and side surfaces of the electrode assembly 400 (both side surfaces in the X axis direction in this embodiment, i.e., in a direction intersecting with an arrangement direction of the electrode assembly 400 and the lid plate 110 (Z axis direction)). The side spacers 700 play a role of restricting the position of the electrode assembly 400, for example. Similarly to the above-mentioned upper spacer 500, the side spacers 700 are made of a material having insulating property such as PC, PP, PE, or PPS, for example.

Figure 2:
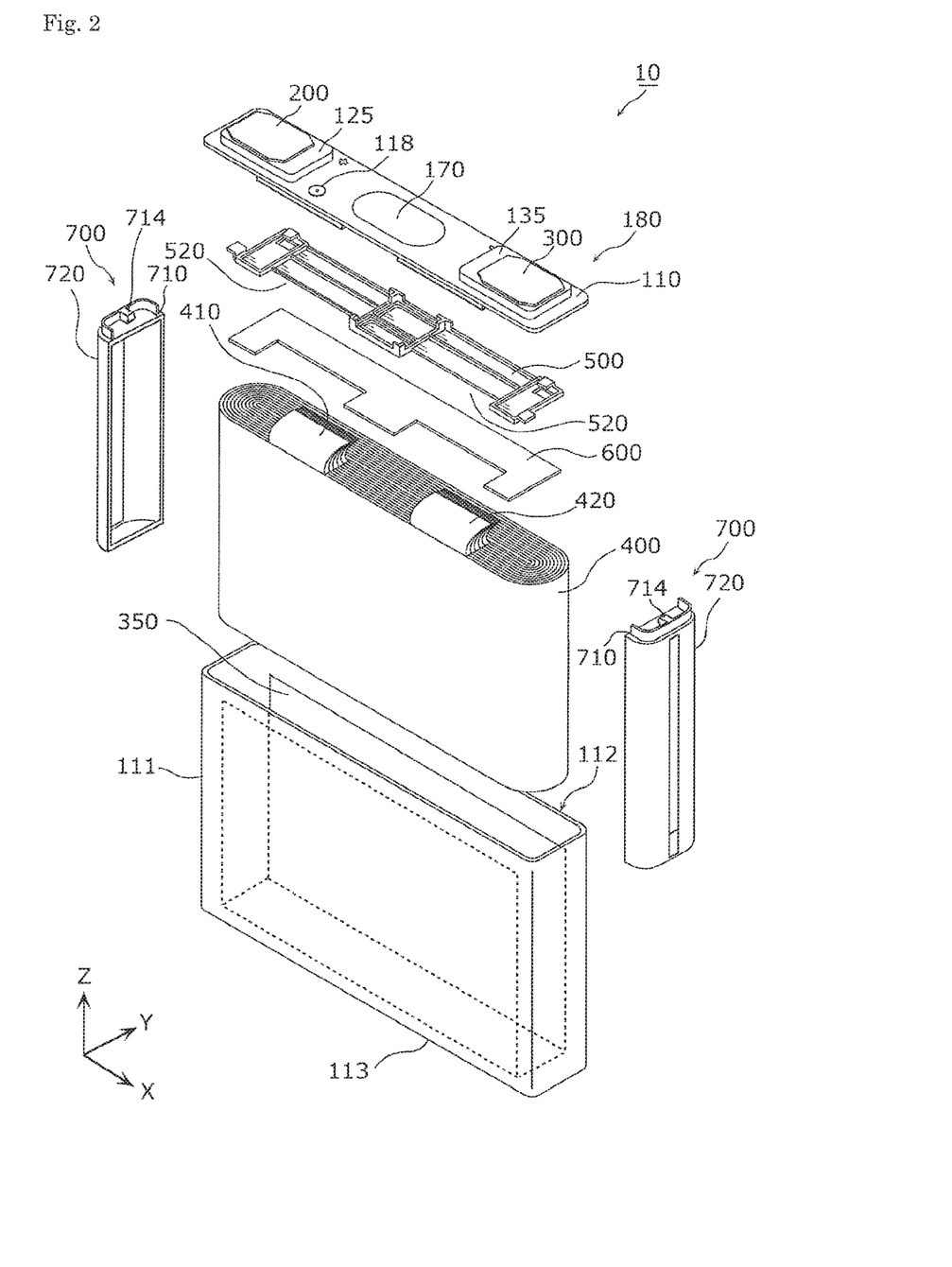
FIG. 2 is an exploded perspective view of the energy storage device according to the embodiment.
Figure 3:
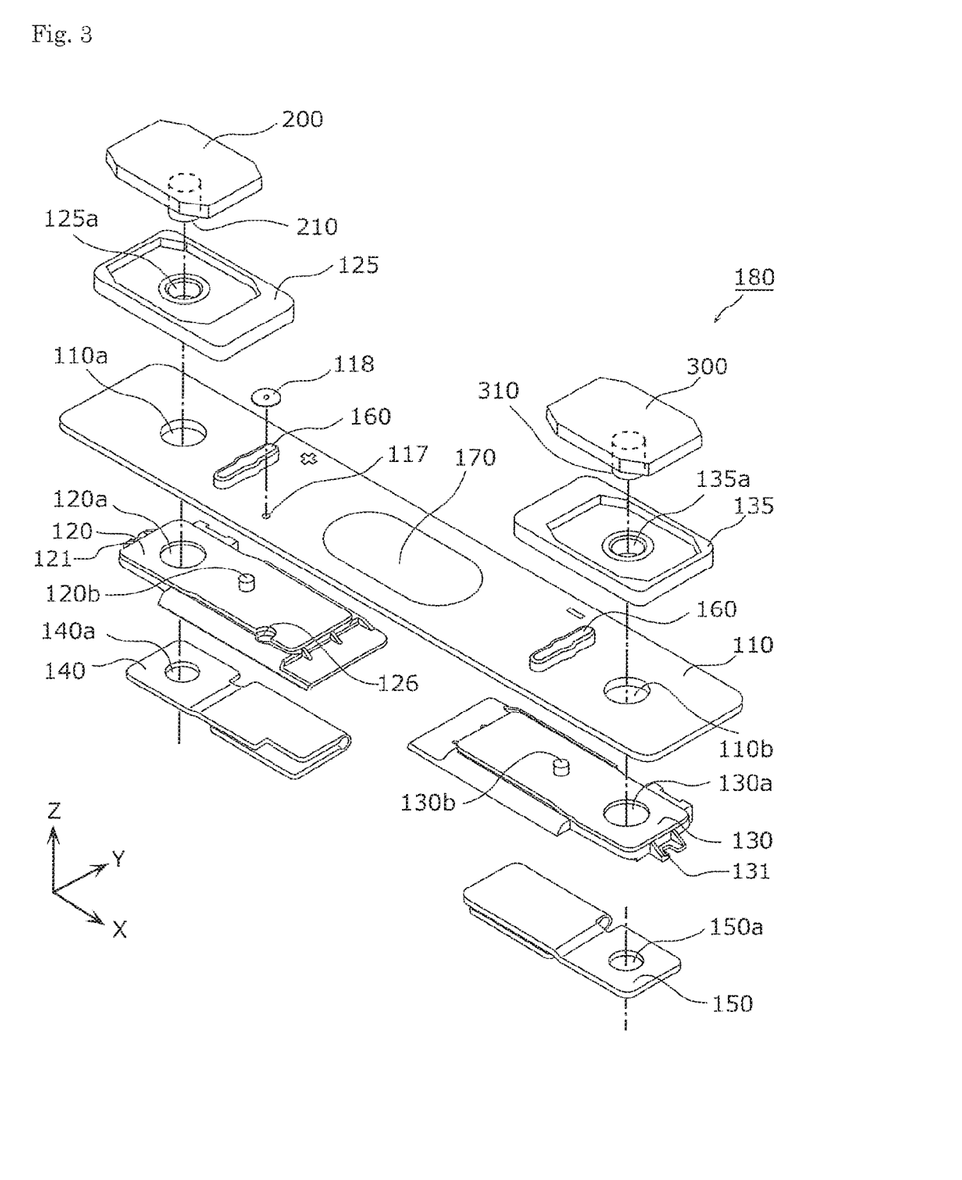
FIG. 3 is an exploded perspective view of a lid structural body according to the embodiment.

The energy storage device 10 may include other elements such as a buffer sheet disposed between the electrode assembly 400 and a bottom 113 of the container 100 (container body 111) in addition to the elements shown in FIG. 1 to FIG. 3. Although an electrolyte solution (non-aqueous electrolyte) is sealed in the container 100 of the energy storage device 10, the illustration of the electrolyte solution is omitted in the drawings.

The container 100 is a rectangular-shaped case, and includes the container body 111 and the lid plate 110. Although a material for forming the container body 111 and the lid plate 110 is not particularly limited, the container body 111 and the lid plate 110 are preferably made of a weldable metal such as stainless steel, aluminum, an aluminum alloy, for example. Further, a shape of the container 100 is not limited to a rectangular shape, and the container 100 may have other shapes such as a circular cylindrical shape, an elongated circular cylindrical shape.

The container body 111 is a cylindrical body having a rectangular shape as viewed in a top plan view, and has an opening 112 on one end portion thereof and has a bottom 113 on the other end portion thereof. At the time of assembling the energy storage device 10, the electrode assembly 400, the side spacers 700 and the like are inserted into the container body 111 of the container 100 through the opening 112. A direction that the electrode assembly 400, the side spacers 700 and the like are inserted through the opening 112 is assumed as an insertion direction (Z-axis direction).

An insulating sheet 350, which covers the electrode assembly 400 is disposed in the inside of the container body 111. The insulating sheet 350 is made of a material having an insulating property such as PC, PP, PE, or PPS, for example. The insulating sheet 350 is overlapped to an inner peripheral surface of the container body 111, and is positioned between the electrode assembly 400 and the container body 111. To be more specific, the insulating sheet 350 is disposed in an overlapping manner to a pair of inner peripheral surfaces of the container body 111, which forms long sides of an opening 112 as viewed in a top plan view, and to an inner surface of the bottom 113.

The container body 111 is configured such that the inside of the container body 111 is hermetically sealed by joining the lid plate 110 to the container body 111 by welding or the like after the electrode assembly 400, the insulating sheet 350 and the like are accommodated in the inside of the container body 111.

The lid plate 110 is a plate-like member, which closes the opening 112 of the container body 111. As shown in FIG. 2 and FIG. 3, a gas release valve 170, an electrolyte solution filling port 117, through holes 110a, 110b, and two projecting portions 160 are formed on the lid plate 110. The gas release valve 170 has a function of releasing a gas in the container 100 by being opened when an internal pressure of the container 100 is increased.

The electrolyte solution filling port 117 is a through hole for filling an electrolyte solution into the container 100 at the time of manufacturing the energy storage device 10. An electrolyte solution-filling plug 118 is disposed on the lid plate 110 so as to close the electrolyte solution filling port 117. That is, at the time of manufacturing the energy storage device 10, by filling an electrolyte solution into the container 100 through the electrolyte solution filling port 117 and by closing the electrolyte solution filling port 117 by joining the electrolyte solution-filling plug 118 to the lid plate 110 by welding, the electrolyte solution is accommodated in the container 100. As an electrolyte solution sealed in the container 100, a kind of the electrolyte solution is not particularly limited and any kind of electrolyte solution can be selected from various kinds of electrolyte solutions provided that performance of the energy storage device 10 is not impaired.

In this embodiment, each of the two projecting portions 160 is disposed on the lid plate 110 by forming a portion of the lid plate 110 into a projecting shape and, for example, is used for positioning the upper insulating member 125 or 135. On a backside of the projecting portion 160, a recessed portion (not shown in the drawing) having an upwardly recessed shape is formed, and an engaging projection 120b or 130b of the lower insulating member 120 or 130 is engaged with the recessed portion. With such a configuration, the lower insulating member 120 or 130 is also positioned and is fixed to the lid plate 110.

The upper insulating member 125 is a member, which provides electrical insulation between the positive electrode terminal 200 and the lid plate 110. The lower insulating member 120 is a member, which provides electric insulation between the positive electrode current collector 140 and the lid plate 110. The upper insulating member 135 is a member, which provides electric insulation between the negative electrode terminal 300 and the lid plate 110. The lower insulating member 130 is a member, which provides electric insulation between the negative electrode current collector 150 and the lid plate 110. There may be a case where the upper insulating members 125, 135 are also referred to as upper gaskets, for example, and there may be also a case where the lower insulating members 120, 130 are referred to as lower gaskets, for example. That is, in this embodiment, the upper insulating members 125, 135 and the lower insulating members 120, 130 also have a function of providing sealing between the electrode terminal (200 or 300) and the container 100.

Similarly to the upper spacer 500, the upper insulating members 125, 135 and the lower insulating members 120, 130 are made of a material having insulating property such as PC, PP, PE or PPS, for example.

As shown in FIG. 3, on an upper surface of the lower insulating member 130, an engaging projection 130b which engages with the projecting portion 160 is formed in a projecting manner. A recessed portion is formed on a lower surface of the lower insulating member 130, and the negative electrode current collector 150 is accommodated in the recessed portion. In one end portion of the lower insulating member 130, a through hole 130a which is communicated with a through hole 150a formed in the negative electrode current collector 150 is formed. A fastening portion 310 of the negative electrode terminal 300 is inserted into the through holes 130a, 150a.

On an upper surface of the lower insulating member 120, an engaging projection 120b which engages with the projecting portion 160 is formed in a projecting manner. A recessed portion is formed on a lower surface of the lower insulating member 120, and the positive electrode current collector 140 is accommodated in the recessed portion. In one end portion of the lower insulating member 120, a through hole 120a which is communicated with a through hole 140a formed in the positive electrode current collector 140 is formed. A fastening portion 210 of the positive electrode terminal 200 is inserted into the through holes 120a, 140a. Further, in a portion of the lower insulating member 120 positioned directly below the electrolyte solution filling port 117, a through hole 126 which guides an electrolyte solution flowing into the container 100 through the electrolyte solution filling port 117 in a direction toward the electrode assembly 400 is formed.

On the lower insulating members 120, 130, engaging portions 121, 131, which engage with the side spacers 700 are respectively formed. To be more specific, the engaging portions 121, 131 project from end portions of the lower insulating members 120, 130 on an outer side. Since the engaging portions 121, 131 engage with the side spacers 700, the positions of the lower insulating members 120, 130 with respect to the side spacers 700 are decided. As a result, the position of the lid structural body 180 with respect to the side spacers 700 is decided. An engagement state of the engaging portions 121, 131 with the side spacers 700 is described later.

As shown in FIG. 1 to FIG. 3, the positive electrode terminal 200 is an electrode terminal, which is electrically connected to the positive electrode of the electrode assembly 400 through the positive electrode current collector 140. The negative electrode terminal 300 is an electrode terminal, which is electrically connected to the negative electrode of the electrode assembly 400 through the negative electrode current collector 150. That is, the positive electrode terminal 200 and the negative electrode terminal 300 are metal made electrode terminals through which electricity stored in the electrode assembly 400 is taken out to a space outside the energy storage device 10, and through which electricity is introduced into a space inside the energy storage device 10 for storing the electricity in the electrode assembly 400. The positive electrode terminal 200 and the negative electrode terminal 300 are made of metal such as aluminum or an aluminum alloy.

The fastening portion 210, which fastens the container 100 and the positive electrode current collector 140 to each other is formed on the positive electrode terminal 200. The fastening portion 310, which fastens the container 100 and the negative electrode current collector 150 to each other is formed on the negative electrode terminal 300.

The fastening portion 210 is a shaft member (rivet) extending downward from the positive electrode terminal 200, and the fastening portion 210 is inserted into the through hole 140a of the positive electrode current collector 110 and, thereafter, the fastening portion 210 is swaged. To be more specific, the fastening portion 210 is inserted into the through hole 125a formed in the upper insulating member 125, the through hole 110a formed in the lid plate 110, the through hole 120a formed in the lower insulating member 120, and the through hole 140a formed in the positive electrode current collector 140 and, thereafter, the fastening portion 210 is swaged. With such a configuration, the positive electrode terminal 200 and the positive electrode current collector 140 are electrically connected to each other, and the positive electrode current collector 140 is fixed to the lid plate 110 together with the positive electrode terminal 200, the upper insulating member 125, and the lower insulating member 120.

The fastening portion 310 is a shaft member (rivet) extending downward from the negative electrode terminal 300, and the fastening portion 310 is inserted into the through hole 150a formed in the negative electrode current collector 150 and, thereafter, the fastening portion 310 is caulked. To be more specific, the fastening portion 310 is inserted into the through hole 135a formed in the upper insulating member 135, the through hole 110b formed in the lid plate 110, the through hole 130a formed in the lower insulating member 130, and the through hole 150a formed in the negative electrode current collector 150 and, thereafter, the fastening portion 310 is caulked. With such a configuration, the negative electrode terminal 300 and the negative electrode current collector 150 are electrically connected to each other, and the negative electrode current collector 150 is fixed to the lid plate 110 together with the negative electrode terminal 300, the upper insulating member 135, and the lower insulating member 130.

The fastening portion 310 may be formed as an integral body with the negative electrode terminal 300. Alternatively, the fastening portion 310 may be formed as a part separate from the negative electrode terminal 300, and the fastening portion 310 may be fixed to the negative electrode terminal 300 by a technique such as swaging or welding. The fastening portion 310 may be made of metal such as copper or a copper alloy, which differs from metal for forming the negative electrode terminal 300. The same goes also for the relationship between the fastening portion 210 and the positive electrode terminal 200.

The positive electrode current collector 140 is a member, which is disposed between the electrode assembly 400 and the container 100 so as to electrically connect the electrode assembly 400 and the positive electrode terminal 200 to each other. The positive electrode current collector 140 is made of metal such as aluminum or an aluminum alloy, for example. To be more specific, the positive electrode current collector 110 is electrically connected to the positive-electrode tab portion 410 of the electrode assembly 400 and, at the same time, is electrically connected to the fastening portion 210 of the positive electrode terminal 200.

The negative electrode current collector 150 is a member, which is disposed between the electrode assembly 400 and the container 100 so as to electrically connect the electrode assembly 400 and the negative electrode terminal 300 to each other. The negative electrode current collector 150 is made of metal such as copper or a copper alloy. To be more specific, the negative electrode current collector 150 is electrically connected to the negative-electrode tab portion 420 of the electrode assembly 400 and, at the same time, is electrically connected to the fastening portion 310 of the negative electrode terminal 300.

A portion of the positive electrode current collector 140 to which the tab portion 410 is connected and a portion of the negative electrode current collector 150 to which the tab portion 420 is connected are respectively formed into a shape where the portion is bent with respect to other portions of the current collector.

Next, the configuration of the electrode assembly 400 is described with reference to FIG. 4.

Figure 4:
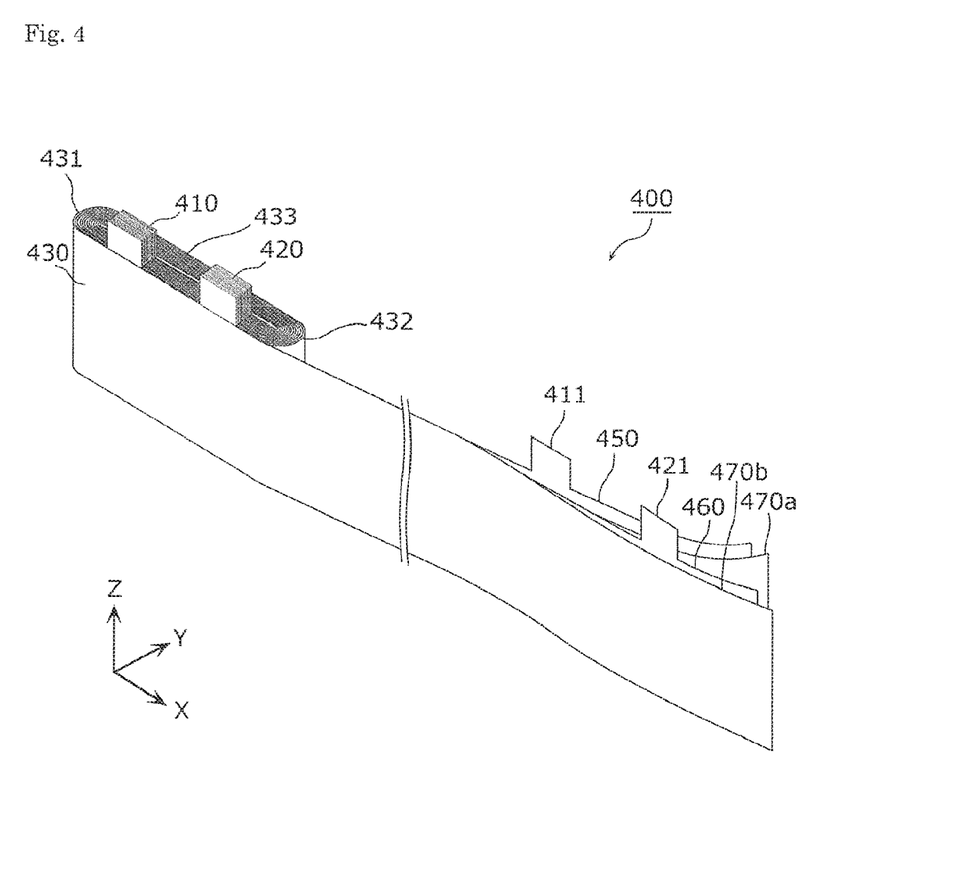
FIG. 4 is a perspective view showing a configuration of an electrode assembly according to the embodiment.

FIG. 4 is a perspective view showing the configuration of the electrode assembly 400 according to the embodiment. FIG. 4 shows the electrode assembly 400 in a wound state in a partially developed manner.

The electrode assembly 400 is an energy storage element (power generating element) which can store electricity. The electrode assembly 400 is formed such that a positive electrode 450, a negative electrode 460 and separators 470a and 470b are alternately stacked with each other and wound around each other. That is, the electrode assembly 400 is formed such that the positive electrode 450, the separator 470a, the negative electrode 460 and the separator 470b are stacked with each other in this order, and, are wound around so as to form an elongated circular shape in cross section.

The positive electrode 150 is a plate where a positive active material layer is formed on a surface of a positive electrode substrate layer formed using a metal foil having an elongated strip shape and made of aluminum, an aluminum alloy or the like. As a positive active material used for forming the positive active material layer, any known material can be used as desired provided that the positive active material can occlude and discharge lithium ions.

The negative electrode 460 is a plate where a negative active material layer is formed on a surface of a negative electrode substrate layer formed using a metal foil having an elongated strip shape and made of copper, a copper alloy or the like. As a negative active material used for forming the negative active material layer, any known material can be used as desired provided that the negative active material can occlude and discharge lithium ions.

The separators 470a, 470b are respectively formed using a microporous sheet made of a resin. As a material for forming the separators 470a, 470b used in the energy storage device 10, any known material can be used as desired provided that the performance of the energy storage device 10 is not impaired.

The positive electrode 450 has a plurality of projecting portions 411 projecting outward on one edge thereof in the direction of the winding axis. Similarly, the negative electrode 460 also has a plurality of projecting portions 421 projecting outward on one edge thereof in the direction of the winding axis. The plurality of projecting portions 411 and the plurality of projecting portions 421 are portions where an active material is not applied so that the substrate layer is exposed (active material non-coated portions).

The winding axis is an imaginary axis, which is used as a center axis at the time of winding the positive electrode 450, the negative electrode 460 and the like. In this embodiment, the winding axis is a straight line, which passes the center of the electrode assembly 400 and extends parallel to the Z-axis direction.

The plurality of projecting portions 411 and the plurality of projecting portions 421 are disposed on an edge of the positive electrode 450 and an edge of the negative electrode 460 on the same side in the direction of the winding axis (edges on a plus side in the Z-axis direction in FIG. 4). When the positive electrode 450 and the negative electrode 460 are stacked with each other, the plurality of projecting portions 411 and the plurality of projecting portions 421 are respectively stacked with each other at predetermined positions in the electrode assembly 400. TO be more specific, when the positive electrode 450 is stacked by winding, the plurality of projecting portions 411 are stacked on one edge of the positive electrode 450 in the direction of the winding axis at a predetermined position in the circumferential direction. On the other hand, when the negative electrode 460 is stacked by winding, the plurality of projecting portions 421 are stacked on one edge of the negative electrode 460 in the direction of the winding axis at a predetermined position in the circumferential direction which differs from the position where the plurality of projecting portions 411 are stacked.

As a result, the tab portion 410 formed by stacking the plurality of projecting portions 411 and the tab portion 420 formed by stacking the plurality of projecting portions 421 are formed on the electrode assembly 400. The tab portion 410 is gathered toward the center in the stacking direction, for example, and is joined to the positive electrode current collector 140 by ultrasonic welding, for example. The tab portion 420 is gathered toward the center in the stacking direction, for example, and is joined to the negative electrode current collector 150 by ultrasonic welding, for example. With such a configuration, one edge portion of the electrode assembly 400 on a side where the tab portions 410, 420 are disposed, that is, one edge portion of the electrode assembly 400 in the direction of the winding axis opposedly faces the lid structural body 180.

The tab portions 410, 420 are portion through which electricity is introduced into and discharged from the electrode assembly 400, and may be referred to as "leads (lead portions)", "current collecting portions" or the like.

In this embodiment, the tab portion 410 is formed by stacking the projecting portions 411 where the substrate layer is exposed and hence, the tab portion 410 does not contribute to the generation of power. In the same manner, the tab portion 420 is formed by stacking the projecting portions 421 where the substrate layer is exposed and hence, the tab portion 420 does not contribute to the generation of power. On the other hand, a portion of the electrode assembly 400 other than the tab portions 410, 420 is formed by stacking portions, at which an active material is applied to the substrate layer, and the separators 470a, 470b. Thus, such a portion contributes to the generation of power. Hereinafter, such a portion is referred to as "body portion 430". Both end portions of the body portion 430 in the X-axis direction form curved portions 431, 432 each of which has a curved outer peripheral surface. A portion of the electrode assembly 400 disposed between the curved portions 431, 432 forms a flat portion 433 which has flat outer side surfaces. As described above, the electrode assembly 400 is formed into an elongated circular shape where the flat portion 433 is disposed between two curved portions 431, 432.

Next, the specific configuration of the side spacer 700 is described.

Figure 5:
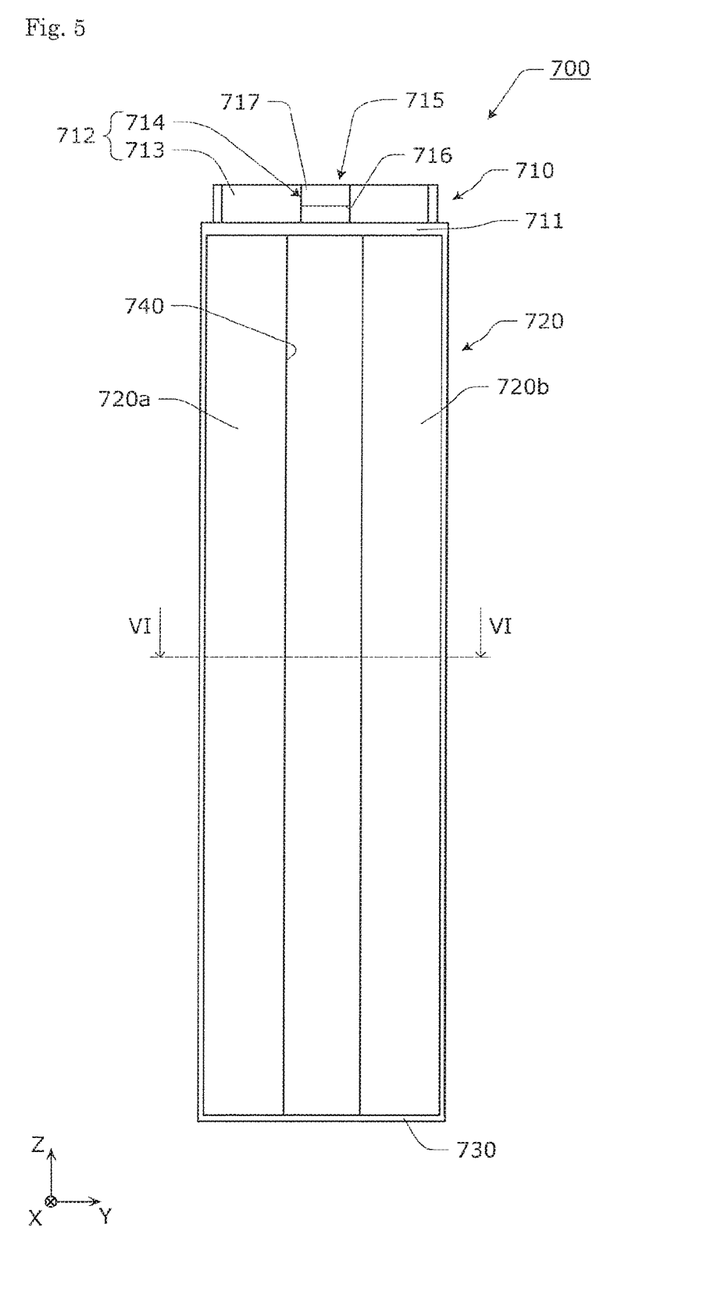
FIG. 5 is a front view of a side spacer according to the embodiment as viewed from the inside of the side spacer.
Figure 6:
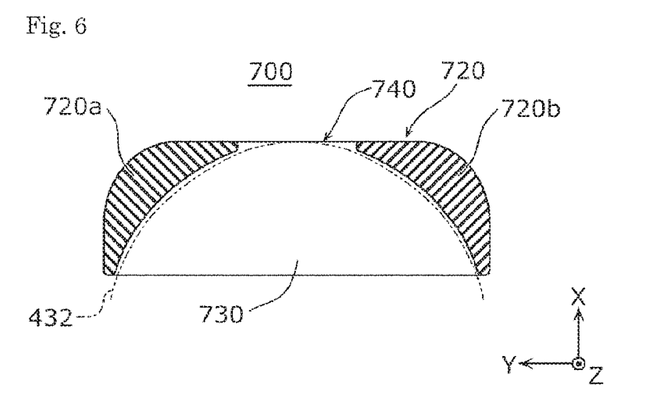
FIG. 6 is a cross-sectional view of the side spacer taken along an X-Y plane including a line VI-VI in FIG. 5.
Figure 7:
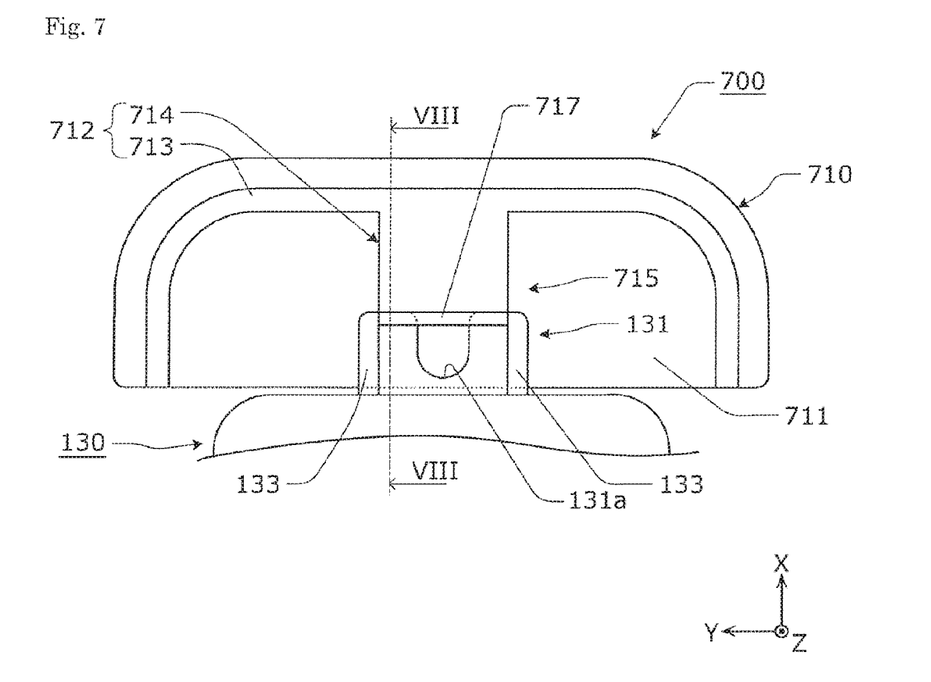
FIG. 7 is a top plan view of the side spacer according to the embodiment.
Figure 8:
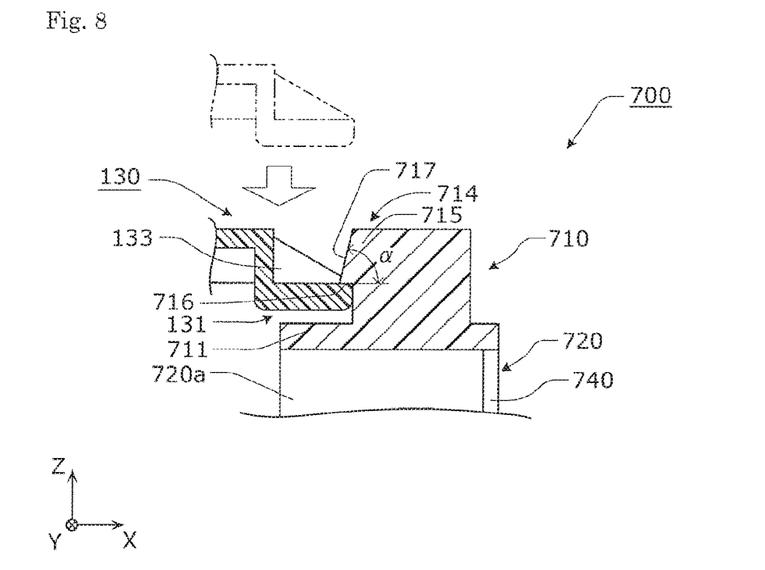
FIG. 8 is a cross-sectional view of the side spacer taken along a Z-X plane including a line VIII-VIII in FIG. 7.

FIG. 5 is a front view of the side spacer 700 according to the embodiment as viewed from the inside of the side spacer 700. FIG. 6 is a cross-sectional view of the side spacer 700 taken along an X-Y plane including a line VI-VI in FIG. 5. FIG. 7 is a top plan view of the side spacer 700 according to the embodiment. FIG. 8 is a cross-sectional view of the side spacer 700 taken along a Z-X plane including a line VII-VIII in FIG. 7.

FIG. 7 and FIG. 8 show a state where the engaging portion 131 of the lower insulating member 130 engages with the side spacer 700. The configuration on a positive electrode side is substantially equal to the corresponding configuration on a negative electrode side and hence, in this specification, the description of the configuration on the positive electrode side is omitted.

As shown in FIG. 5 to FIG. 8, the side spacer 700 is an elongated member which extends in the direction of the winding axis (Z axis direction), and is made of a material having insulating property such as PC, PP, PE, or PPS. The side spacer 700 includes a base portion 710, a wall body 720, and a bottom plate 730.

The base portion 710 includes a ceiling plate 711 and a wall portion 712. The ceiling plate 711 is formed into an approximately rectangular shape as viewed in a top plan view where a pair of corner portions disposed adjacently to each other is formed into a rounded shape. The wall portion 712 is formed on an upper surface of the ceiling plate 711.

The wall portion 712 has a peripheral wall 713 and a locking portion 714.

The peripheral wall 713 opens at a portion corresponding to one side of the ceiling plate 711, and is formed on the ceiling plate 711 in an erected manner along other sides of the ceiling plate 711.

The locking portion 714 is locked to a portion of the lid structural body 180 in a move-away direction that the lid structural body 180 is moved away from the container 100 (a plus side in the Z axis direction). To be more specific, the locking portion 714 is formed on the ceiling plate 711 in an erected manner such that the locking portion 714 extends inward from the center of the peripheral wall 713. A pawl portion 715, which projects inward is formed on an upper portion of a distal end surface of the locking portion 714. A lower surface 716 of the pawl portion 715 is a flat surface extending parallel to the upper surface of the base portion 710, and is a contact surface, which is brought into contact with a portion of the lid structural body 180. A distal end surface 717 of the pawl portion 715 is disposed on a more move-away direction side than the contact surface. The distal end surface 717 is an inclined surface inclined such that an angle α made by the distal end surface 717 and the lower surface 716 becomes an acute angle.

The wall body 720 extends in the Z axis direction, the ceiling plate 711 is connected to one end portion of the wall body 720, and the bottom plate 730 is connected to the other end portion of the wall body 720. An opening portion 740 which makes the wall body 720 opened is formed in a center portion of the wall body 720 in the Y-axis direction. The opening portion 740 is formed such that the opening portion 740 extends along the Z-axis direction so as to make the wall body 720 opened from the ceiling plate 711 to the bottom plate 730.

In the wall body 720, portions, which are disposed opposite to each other with the opening portion 740 sandwiched therebetween, are referred to as a first wall body 720a and a second wall body 720b respectively. The first wall body 720a and the second wall body 720b respectively have a uniform shape from one end to the other end in the Z-axis direction. As shown in FIG. 6, the first wall body 720a and the second wall body 720b respectively have a cross-sectional shape where an inner surface of the wall body is formed into a smoothly curved concave surface as a whole. On the other hand, outer surfaces of the first wall body 720a and the second wall body 720b are respectively formed into a smoothly curved convex surface as a whole such that outer surfaces of the first wall body 720a and the second wall body 720b correspond to an inner surface shape of the container body 111 of the container 100.

Similar to the ceiling plate 711, the bottom plate 730 is formed into an approximately rectangular shape as viewed in a top plan view where parts of corner portions are formed into a rounded shape. The wall body 720 is connected to an upper surface of the bottom plate 730.

The side spacers are respectively 700 individually mounted on the curved portions 431, 432 of the electrode assembly 400. To be more specific, the side spacers 700 are mounted on the electrode assembly 400 such that portions of the curved portions 431, 432 are exposed from the opening portions 740.

In FIG. 6, an outer shape of the curved portion 432 is indicated by a double-dotted chain line. The curved portions 431, 432 have substantially the same shape and hence, in this specification, the positional relationship between the side spacer 700 and the curved portion 432 is described as an example, and the description of the positional relationship between the side spacer 700 and the curved portion 431 is omitted. As shown in FIG. 6, the side spacer 700 is mounted on the electrode assembly 400 such that an outer surface of the wall body 720 is disposed coplanar with a portion of a surface of the curved portion 432. In such a configuration, the portion of the surface of the curved portion 432 is a region including a peak portion of the curved portion 432. With such a configuration, the curved portion 432 is accommodated in the inside of the opening portion 740 of the side spacer 700. Further, the inner surface of the wall body 720 is formed into a curved concave surface and hence, the inner surface of the wall body 720 can be brought into contact with the surface of the curved portion 432 without collapsing the curved surface shape of the curved portion 432 thus stabilizing the shape of the curved portion 432.

Next, a connection state between the side spacer 700 and the lower insulating member 120, 130 is described with reference to FIG. 7 and FIG. 8. The connection state between the lower insulating member 120 and the side spacer 700 and the connection state between the lower insulating member 130 and the side spacer 700 are substantially equal. Accordingly, hereinafter, the connection state between the lower insulating member 130 and the side spacer 700 is described as an example, and the description of the connection state between the lower insulating member 120 and the side spacer 700 is omitted.

As shown in FIG. 7, the engaging portion 131 projects from one end portion of the lower insulating member 130 on an outer side. A rib 133, which extends over the whole length of the engaging portion 131 is formed on both side portions of the engaging portion 131. Due to the formation of the ribs 133, strength of the engaging portion 131 is increased as a whole. A cutout portion 131a which is indented along the X-axis direction is formed on the center of a distal end of the engaging portion 131. As shown in FIG. 7 and FIG. 8, the lower surface 716 of the pawl portion 715 of the side spacer 700 is brought into contact with an upper surface of the engaging portion 131 between the pair of ribs 133. That is, the pawl portion 715 is caught by the lower insulating member 130, which is a part of the lid structural body 180 in the move-away direction and hence, lifting of the lid structural body 180 is restricted by the pawl portion 715. Further, the pawl portion 715 is disposed between the pair of ribs 133 and hence, the movement of the lid structural body 180 in the Y-axis direction can be restricted by the pawl portion 715.

Next, a method of manufacturing the energy storage device 10 is described.

First, the electrode assembly 400 shown in FIG. 4 is formed such that the positive electrode 450, the negative electrode 460 and the separators 470a and 470b are alternately stacked with each other and wound around each other. When the winding of these elements is finished, an adhesive tape (not shown in the drawing) is adhered to the flat portion 433 of the electrode assembly 400 so as to prevent the electrode assembly 400 from being developed.

Next, the tab portion. 410 of the electrode assembly 400 is fixed to the positive electrode current collector 140 by welding, and the tab portion 420 of the electrode assembly 400 is fixed to the negative electrode current collector 150 by welding. With such an operation-, the lid structural body 180 and the electrode assembly 400 are integrally formed with each other. A portion of the positive electrode current collector 140 to which the tab portion 410 is connected and a portion of the negative electrode current collector 150 to which the tab portion 420 is connected are respectively brought into a stretched state with respect to other portions at the time of welding, and these portions are bent after welding is finished.

Subsequently, the side spacers 700 are mounted on the body portion 430 of the electrode assembly 400. To be more specific, the side spacers 700 are mounted on the curved portions 431, 432 of the body portion 430 individually. Thereafter, the tab portions 410, 420 are bent by pressing the lid structural body 180 fixed to the tab portions 410, 420 to the body portion 430 of the electrode assembly 400. At this stage of the operation, the engaging portion 131 of the lower insulating member 120, 130, which is a portion of the lid structural body 180 is lowered from a state indicated by a double-dashed chain line in FIG. 8, and is guided along the distal end surface 717. In this guiding of the engaging portion 131, a restoring force generated when the tab portions 410, 420 respectively intend to return to an original state and a restoring force which is generated when the positive electrode current collector 140 and the negative electrode current collector 150 respectively intend to return to an original state are applied to the lid structural body 180. That is, the lid structural body 180 is guided along the distal end surfaces 717 against these restoring forces. Thereafter, the engaging portion 131 of the lower insulating member 120, 130 is brought into contact with the lower surface 716 of the pawl portion 715. Due to such an operation, the pawl portion 715 of the side spacer 700 is caught by the engaging portion 131 of the lower insulating member 130 so that lifting of the lid structural body 180 is restricted. That is, even when the positive electrode current collector 140, the negative electrode current collector 150, the tab portions 410, 420 intend to return to an original state, the positional relationship between the lid plate 110 and the container body 111 is maintained.

After the side spacers 700 are mounted on the electrode assembly 400, the side spacers 700 are fixed to the body portion 430 by an adhesive tape (not shown in the drawing).

Next, the electrode assembly 400 and the side spacers 700, which are integrally formed with each other are accommodated in the inside of the container body 111 of the container 100 together with an insulating sheet 350. At this stage of operation, the electrode assembly 400 and the side spacers 700 are inserted into the container body 111 through the opening 112 of the container body 111. Next, the container 100 is assembled by welding the lid plate 110 to the container body 111. In this welding, the positional relationship of the lid plate 110 and the container body 111 is maintained as described above so that welding can be performed in a stable manner. Thereafter, after an electrolyte solution is filled in the container body 111 through the electrolyte solution filling port 117, the electrolyte solution filling port 117 is closed by welding an electrolyte solution-filling plug 118 to the lid plate 110, and the energy storage device 10 is manufactured.

As has been described heretofore, according to this embodiment, the locking portion 714 of the side spacer 700 is locked to a portion of the lid structural body 180 and hence, even when a restoring force of the tab portion 410, 420 in a bent state is applied to the lid structural body 180, the positional displacement of the lid structural body 180 with respect to the container body 111 can be prevented. Accordingly, stable welding between the container body 111 and the lid plate 110 can be realized.

The locking portion 714 of the side spacer 700 is locked to a portion of the lid structural body 180 in a state where the locking portion 714 is caught in the move-away direction and hence, the movement of the lid structural body 180 in the move-away direction, that is, the lifting of the lid structural body 180 can be prevented.

The inclined surface (distal end surface 717) is disposed on a more move-away direction side than the contact surface (lower surface 716) and hence, at the time of bringing the lid structural body 180 closer to the container body 111, the lid structural body 180 is guided along the distal end surface 717 and, thereafter, the lid structural body 180 can be brought into contact with the contact surface 716. Accordingly, the locking portion 714 can be smoothly locked to a portion of the lid structural body 180.

The side spacer 700 is interposed between the container body 111 and the electrode assembly 400 and hence, the side spacer 700 becomes a member, which is positionally minimally displaced in the inside of the container body 111. Since the locking portion 714 is formed on the side spacer 700, even when the lid structural body 180 is going to be positionally displaced, the side spacer 700 minimally follows the lid structural body 180. Accordingly, the positional displacement of the lid structural body 180 can be surely prevented.

The tab portions 410, 420 of the electrode assembly 400 are opposedly face the lid structural body 180 and hence, even when a biasing force attributed to the tab portion 410, 420 is applied to the lid structural body 180, lifting of the lid structural body 180 can be prevented by the locking portion 714.

The electrode assembly 400) is formed by winding plates (the positive electrode 450 and the negative electrode 460), and one end portion of the electrode assembly 400 in a winding axis direction opposedly faces the lid structural body 180 and hence, also in a so-called lateral winding type electrode assembly 400, lifting of the lid structural body 180 can be prevented.

Further, even in the case of the lid structural body 180 having the lower insulating member 120, lifting of the lid structural body 180 can be prevented by locking the locking portion 714 to the lower insulating member 120.

Other Embodiments

The energy storage device according to the present invention has been described with reference to the embodiment heretofore. However, the present invention is not limited to the above-mentioned embodiment.

Configurations acquired by applying various modifications conceived by those who are skilled in the art to the embodiment, or configurations acquired by combining the plurality of constitutional elements described heretofore are also included in the scope of the present invention unless these configurations depart from the gist of the present invention.

In the description made hereinafter, there may be a case where parts identical with the parts in the above-mentioned embodiment are given the same symbols, and the description of such parts is omitted.

For example, the number of electrode assemblies 400 which the energy storage device 10 includes is not limited to one, and the energy storage device 10 may include two or more electrode assemblies 400. In a case where the energy storage device 10 includes a plurality of electrode assemblies 400, a pair of side spacers 700 may be mounted on each electrode assembly 400, or a pair of side spacers may be mounted on a plurality of electrode assemblies.

Further, the positional relationship between the positive-electrode-side tab portion 410 and the negative-electrode-side tab portion 420 which the electrode assembly 400 includes is not particularly limited. For example, in the winding-type electrode assembly 400, the tab portion 410 and the tab portion 420 are disposed on sides opposite to each other in a winding axis direction. In a case where the energy storage device 10 includes a stacking-type electrode assembly, a positive-electrode-side tab portion and a negative-electrode-side tab portion may be disposed in a projecting manner in different directions respectively as viewed in a stacking direction. In this case, it is sufficient that a lower insulating member, a current collector and the like are disposed at a position corresponding to the positive-electrode-side tab portion and a position corresponding to the negative-electrode-side tab portion respectively. In this case, it is sufficient that a locking portion 714 of the side spacer 700 is caught by the lower insulating member, which forms a part of the lid structural body. An object by which the locking portion 714 is caught may be a member other than the lower insulating member provided that the member forms a portion of the lid structural body.

In this embodiment, the description has been made by exemplifying the electrode assembly 400 where one end portion of the electrode assembly 400 in the winding axis direction opposedly faces the lid structural body 180 (so-called lateral winding type electrode assembly). However, an electrode assembly may be adopted where one end portion of the electrode assembly in a direction orthogonal to the winding axis direction opposedly faces the lid structural body (so-called longitudinally winding type electrode assembly).

In this embodiment, the description has been made by exemplifying the case where the side spacer 700 has the locking portion 714. However, a locking portion may not be provided to the side spacer, and an insulating member disposed around the electrode assembly 400 in the inside of the container 100 may have a locking portion.

In this embodiment, the description has been made by exemplifying the case where the locking portion 714 is locked by being caught by a portion of the lid structural body 180 in the move-away direction. However, the locking portion 714 may have any configuration provided that the locking portion 714 is locked to a portion of the lid structural body 180. For example, a locking portion may be locked to a portion of the lid structural body 180 so as to restrict the horizontal movement of the lid structural body 180. To be more specific, a case is considered where a hole portion which penetrates a lid structural body in the Z axis direction is formed in a portion of the lid structural body, and a locking portion which is locked to the hole portion is formed on a side spacer or the like. In this case, the locking portion may be locked to the hole portion by making use of elastic deformation.

INDUSTRIAL APPLICABILITY

The present invention is applicable to an energy storage device such as a lithium ion secondary battery or the like.

DESCRIPTION OF REFERENCE SIGNS

10: energy storage device
110: lid plate
111: container body
120, 130: lower insulating member (gasket)
180: lid structural body
400: electrode assembly
410, 420: tab portion
700: side spacer (insulating member)
714: locking portion
716: lower surface (contact surface)
717: distal end surface (inclined surface)
α: angle

The invention claimed is:
1. An energy storage device, comprising:
an electrode assembly including a tab portion;
a container body accommodating the electrode assembly therein;
a lid structural body including a lid plate which closes the container body; and
an insulating member arranged around a periphery of the electrode assembly in the container body,
wherein the insulating member includes a locking portion locked to a portion of the lid structural body,
wherein the lid structural body further includes a lower insulating member disposed between the lid plate and the electrode assembly in a first direction, and
wherein the locking portion is locked by being hooked to the lower insulating member.
2. The energy storage device according to claim 1, wherein the locking portion is locked by being hooked to the portion of the lid structural body, being hooked to the lower insulating member on a side opposite from the container body.
3. The energy storage device according to claim 2, wherein the locking portion includes a contact surface, which is brought into contact with the portion of the lid structural body in the first direction, and an inclined surface, which is disposed away from the container body than the contact surface and makes an acute angle with the contact surface.
4. The energy storage device according to claim 1, wherein the insulating member comprises a side spacer disposed between the container body and the electrode assembly in a second direction perpendicular to the first direction.
5. The energy storage device according to claim 1, wherein the tab portion of the electrode assembly opposedly faces the lid structural body and is disposed on one end portion of the electrode assembly in the first direction.
6. The energy storage device according to claim 1, wherein the electrode assembly is formed by winding electrode plates, and
wherein one end portion of the electrode assembly, in a winding axis direction, opposedly faces the lid structural body.
7. The energy storage device according to claim 1, wherein the lower insulating member of the lid structural body includes a gasket which ensures gas-tightness in the container body by the lid plate, and
wherein the locking portion is locked by being hooked to the gasket.
8. The energy storage device according to claim 1, wherein the electrode assembly includes a body portion, and
wherein the tab portion projects from the body portion and is disposed between the lid plate and the body portion in the first direction.
9. The energy storage device according to claim 1, wherein the locking portion is disposed between the lid plate and the lower insulating member in the first direction and contacts a top surface of the lower insulating member.
10. The energy storage device according to claim 1, wherein the locking portion includes:
a first surface contacting a top surface of the lower insulating member; and
a second surface contacting a side surface of the lower insulating member.
11. The energy storage device according to claim 10, wherein the locking portion further includes:
a third surface inclined above the first surface with an acute angle to contact the top surface of the lower insulating member.
12. The energy storage device according to claim 1, wherein the lower insulating member includes an engaging portion projecting from an outer edge of the lower insulating member toward the insulating member.
13. The energy storage device according to claim 12, wherein the locking portion includes a pawl portion projecting at a distal end of the locking portion toward the lower insulating member.
14. The energy storage device according to claim 13, wherein, in a recess that extends in the locking portion, an upper surface of the lower insulating member contacts a bottom surface of the pawl portion to hook the locking portion to the lower insulating member.
15. An energy storage device, comprising:
an electrode assembly including a body portion and a tab portion projecting from the body portion;
a container body accommodating the electrode assembly therein;
a lid structural body including a lid plate which closes the container body; and
an insulating member arranged around a periphery of the electrode assembly in the container body,
wherein the insulating member includes a locking portion locked to a portion of the lid structural body, and
wherein the tab portion is disposed between the lid plate and the body portion.

16. The energy storage device according to claim 15, wherein the lid structural body further includes a lower insulating member disposed on a bottom surface of the lid plate and above the electrode assembly, the locking portion being hooked to the lower insulating member.

17. The energy storage device according to claim 16, wherein the locking portion includes:
- a first surface contacting a top surface of the lower insulating member;
- a second surface contacting a side surface of the lower insulating member, and
- a third surface inclined above the first surface with an acute angle to contact the top surface of the lower insulating member.

18. The energy storage device according to claim 16, wherein the lower insulating member includes an engaging portion projecting from an outer edge of the lower insulating member toward the insulating member.

19. The energy storage device according to claim 18, wherein the locking portion includes a pawl portion projecting at a distal end of the locking portion toward the lower insulating member.

20. The energy storage device according to claim 19, wherein, in a recess that extends in the locking portion, an upper surface of the lower insulating member contacts a bottom surface of the pawl portion to hook the locking portion to the lower insulating member.

* * * * *